Feb. 10, 1970 R. H. HARNER ET AL 3,495,173

RADIO TRANSMITTER FOR HIGH VOLTAGE ELECTRIC POWER TRANSMISSION LINE

Filed Oct. 17, 1967 5 Sheets-Sheet 1

Feb. 10, 1970 R. H. HARNER ET AL 3,495,173

RADIO TRANSMITTER FOR HIGH VOLTAGE ELECTRIC POWER TRANSMISSION LINE

Filed Oct. 17, 1967 5 Sheets-Sheet 2

Feb. 10, 1970 R. H. HARNER ET AL 3,495,173

RADIO TRANSMITTER FOR HIGH VOLTAGE ELECTRIC POWER TRANSMISSION LINE

Filed Oct. 17, 1967 5 Sheets-Sheet 3

United States Patent Office 3,495,173
Patented Feb. 10, 1970

3,495,173

RADIO TRANSMITTER FOR HIGH VOLTAGE ELECTRIC POWER TRANSMISSION LINE

Robert H. Harner, Park Ridge, and William R. Goldbach, Des Plaines, Ill., assignors to S & C Electric Company, Chicago, Ill., a corporation of Delaware Filed Oct. 17, 1967, Ser. No. 675,901
Int. Cl. G01r *1/20*
U.S. Cl. 324—127 13 Claims

ABSTRACT OF THE DISCLOSURE

A radio transmitter is mounted in a coaxial shunt connected in series with a high voltage transmission line conductor and is modulated in accordance with current flow therein.

The construction disclosed herein is an improvement over that contained in application Ser. No. 498,696 of Robert H. Harner, filed Oct. 20, 1965.

Among the objects of this invention are: To provide for dissipating heat incident to operation of a radio transmitter module mounted within a coaxial shunt that is connected in series with a high voltage transmission line conductor; to locate the connections between the coaxial shunt and the conductor generally along the same axis; to provide end caps for the coaxial shunt with heat reflecting exterior coatings; to mount power supply circuit means including voltage rectifier and regulating devices for energizing the radio transmitter module on a heat sink carried by one of the end caps; to provide plug and socket means for detachably interconnecting the radio transmitter module and energizing and modulating circuits therefor within the coaxial shunt; to clamp the radio transmitter module in position within the coaxial shunt from which it can be removed without disturbing the coaxial shunt and its connections to the conductor; and to operate the clamp exteriorly of the coaxial shunt.

According to this invention a coaxial shunt is connected in series with and between aligned sections of a conductor of a high voltage electric power transmission line. For three phase operation, three shunts are employed, one for each phase, each with its individual radio transmitter module. When mounted in an upright position, each shunt has an upper and a lower end cap insulated from the respective ends of the shunt. The radio transmitter module is insulatingly mounted on one of the end caps and is arranged to be inserted and removed endwise of the shunt. Plug and socket means interconnect the shunt and the radio transmitter module for energizing and modulating the latter on flow of current through the former. The energizing circuit for the radio transmitter module includes rectifying and voltage regulating devices mounted on a heat sink carried by the other end cap and energized from a secondary winding of a transformer the primary winding of which is a portion of the high voltage conductor. The radio transmitter module is also mounted on a heat sink that is in good heat conducting relation to the coaxial shunt for heat dissipating purposes. The end caps carry reflecting exterior coatings to minimize exterior heat absorption.

Figures 1, 2, 3:
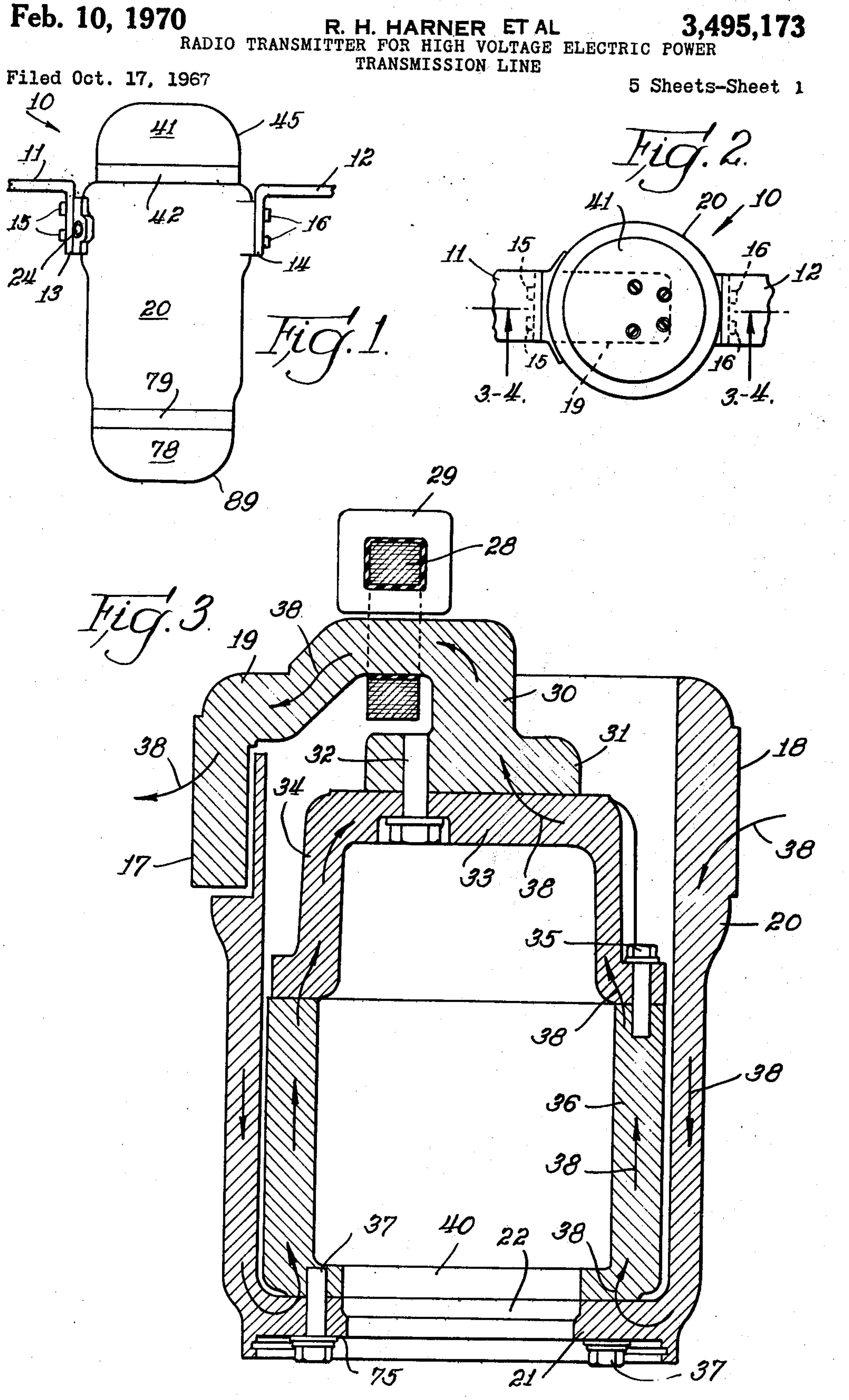
Figure 4:
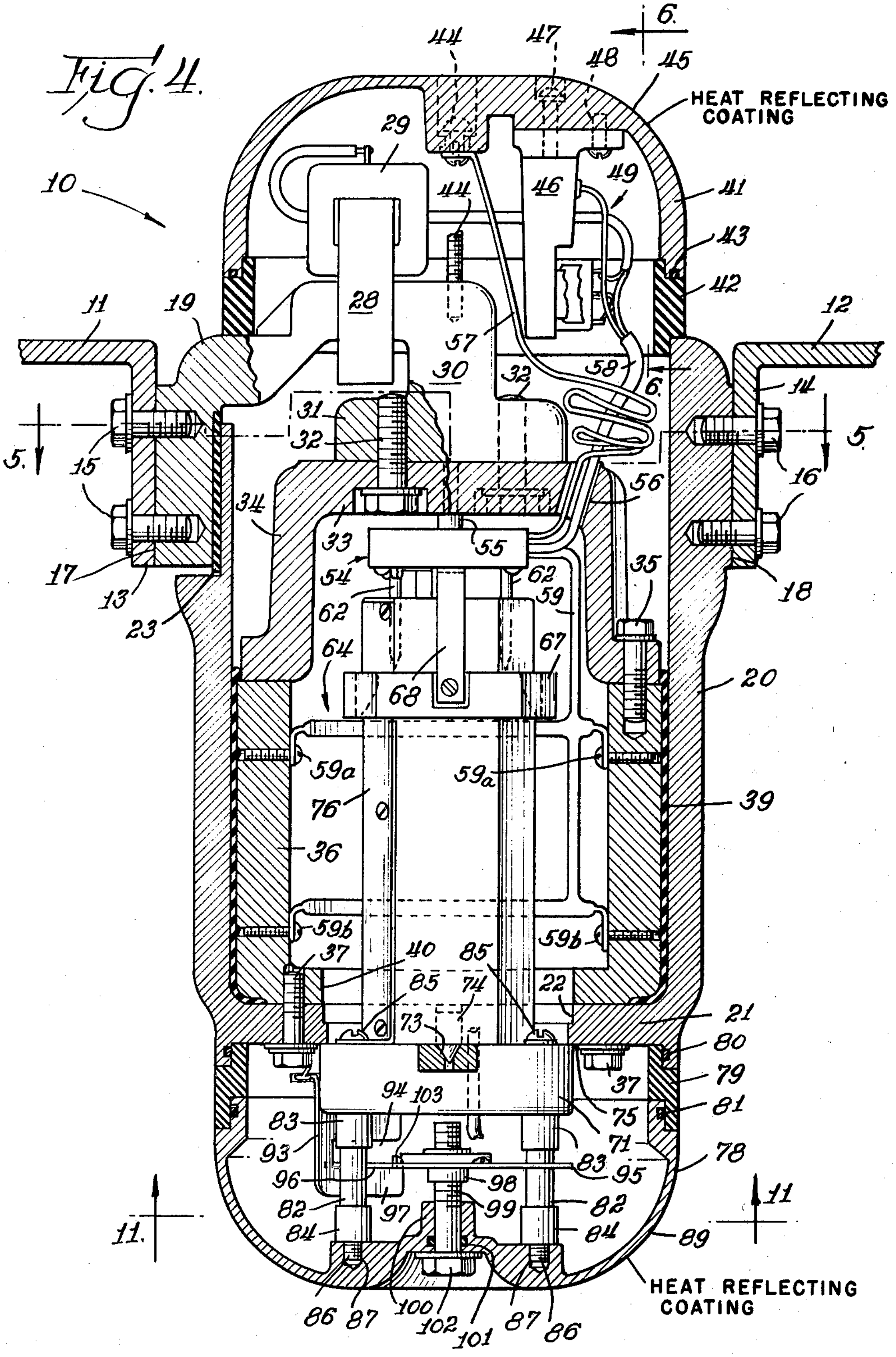
Figure 5:
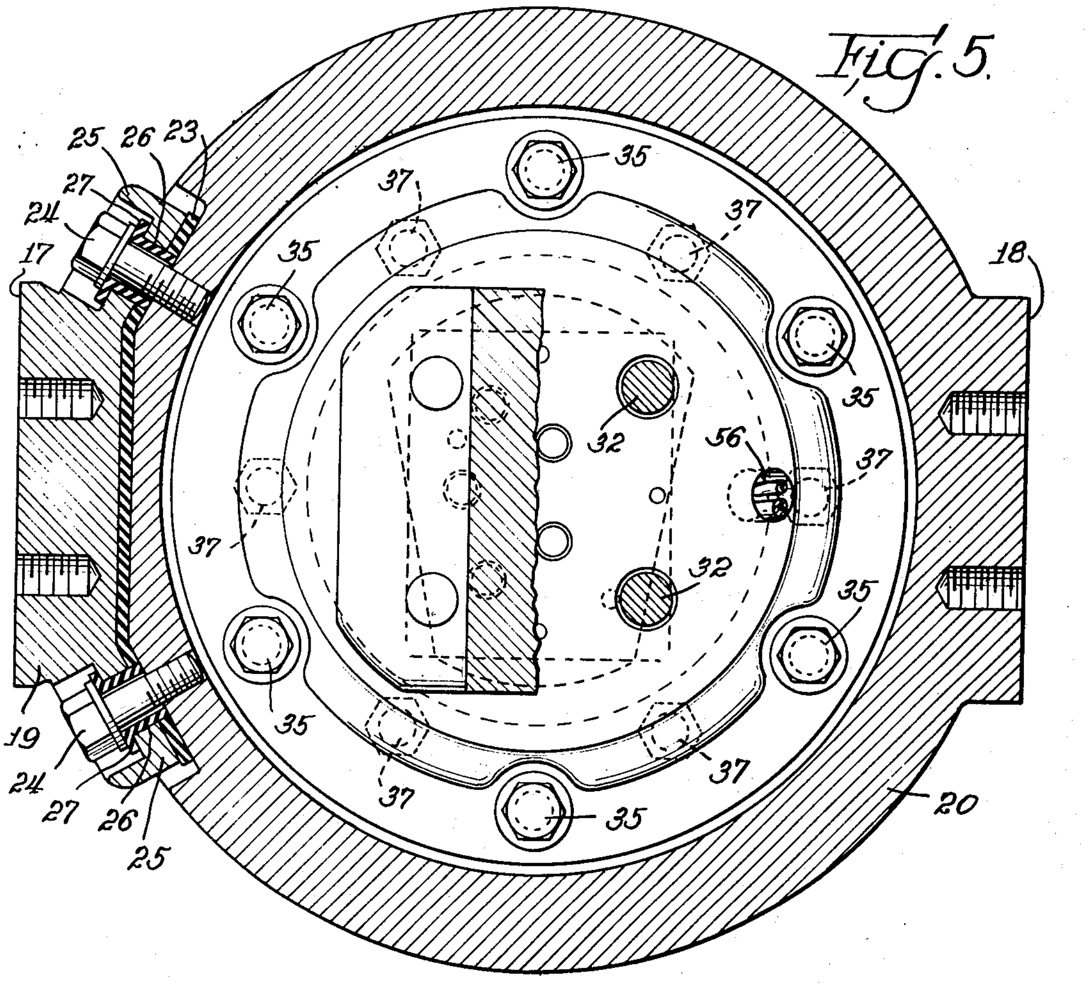
Figure 6:
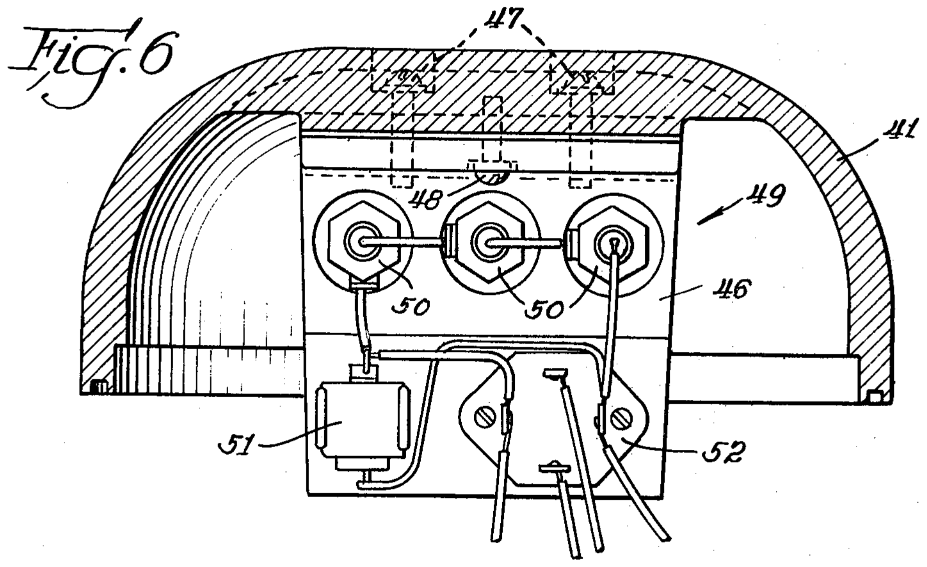
Figures 7, 8, 9:
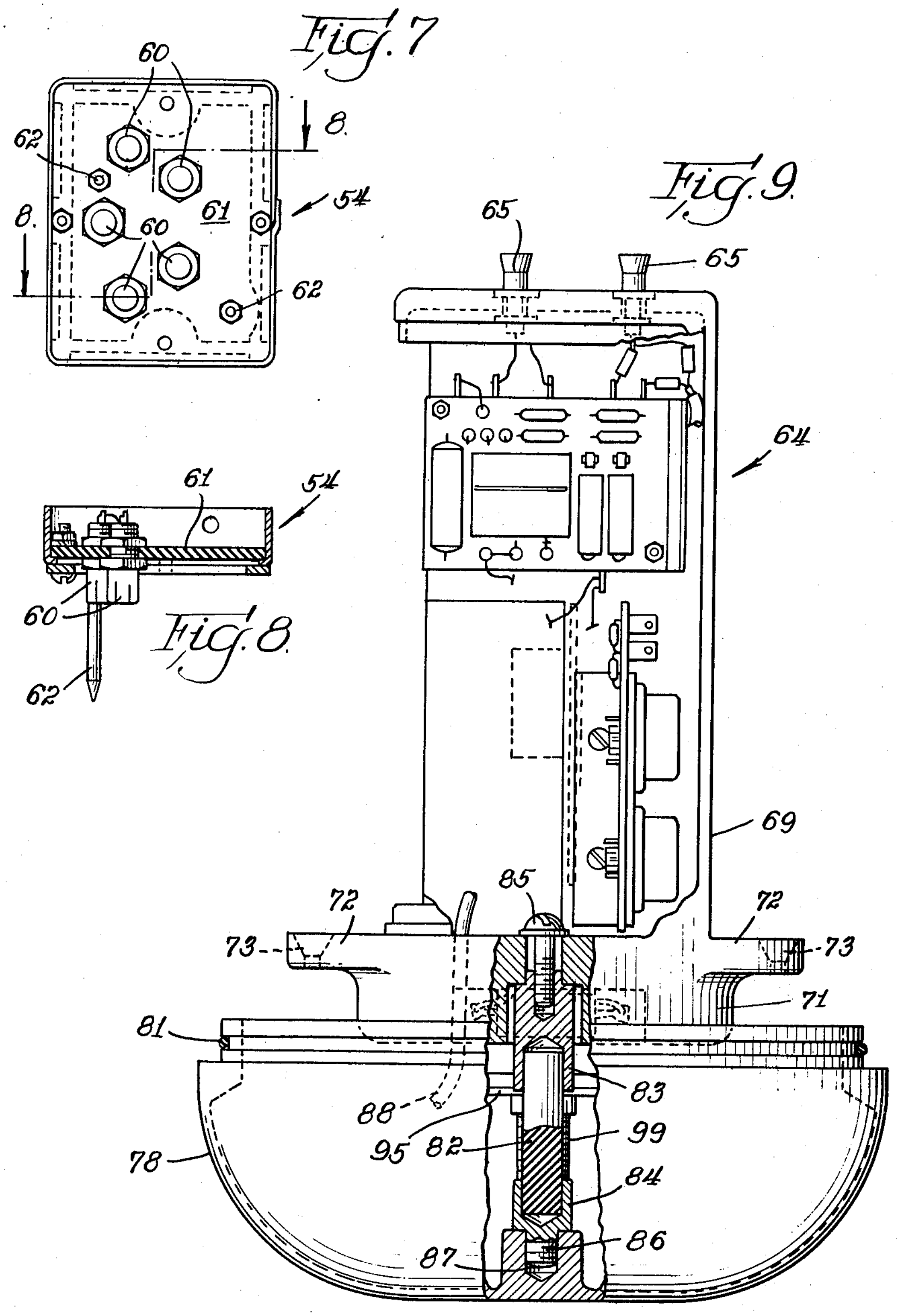
Figure 10:
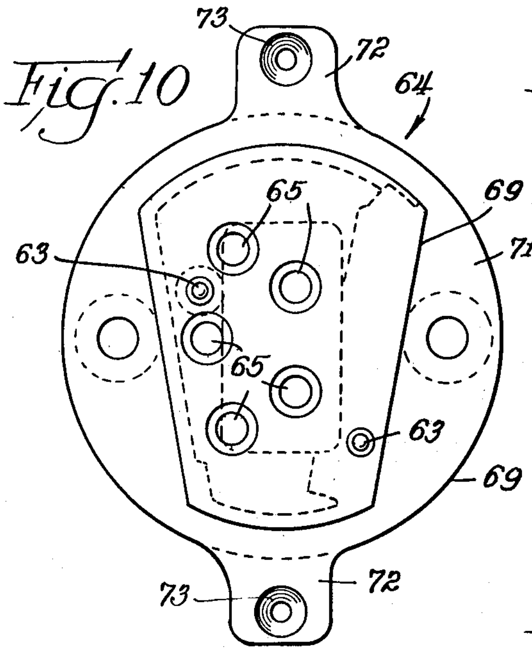
Figure 12:
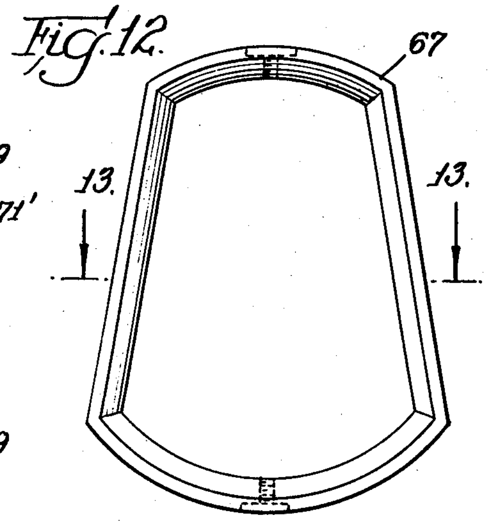
Figures 11, 13:
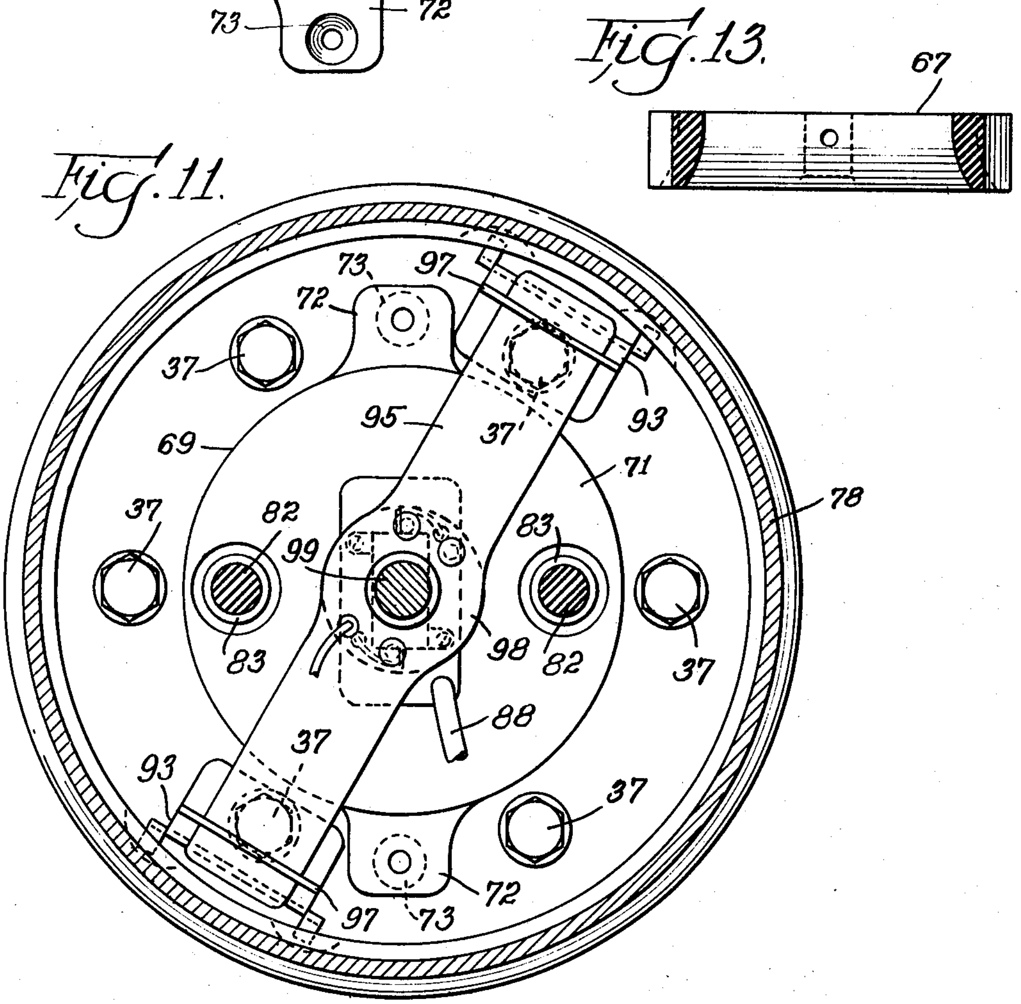

In the drawings: FIG. 1 is a view, in side elevation, of coaxial shunt and a radio transmitter embodying this invention. FIG. 2 is a top plan view of the construction shown in FIG. 1. FIG. 3 is a vertical sectional view, at an enlarged scale, taken generally along the line 3—3 of FIG. 2 to show the path along which the alternating current flows through the coaxial shunt. FIG. 4 is a vertical sectional view at an enlarged scale, taken generally along the line 4—4 of FIG. 2. FIG. 5 is a horizontal sectional view taken generally along the line 5—5 of FIG. 4. FIG. 6 is a vertical sectional view taken generally along the line 6—6 of FIG. 4. FIG. 7 is a top plan view of the module connector that is stationarily mounted within the coaxial shunt. FIG. 8 is a vertical sectional view taken generally along the line 8—8 of FIG. 7. FIG. 9 is a view, in side elevation, of the radio transmitter electronics module and of the lower end cap, certain parts being shown in section and the casing being omitted. FIG. 10 is a top plan view of the electronics module shown in FIG. 9. FIG. 11 is a horizontal sectional view taken generally along the line 11—11 of FIG. 4. FIG. 12 is a bottom plan view of the chassis guide that is employed for directing the radio transmitter electronics module into proper position within the coaxial shunt. FIG. 13 is a vertical sectional view taken generally along the line 13—13 of FIG. 12.

In FIGS. 1, 2 and 4 the reference character 10 designates, generally, a radio transmitter housed in a coaxial shunt that is arranged to be inserted in series circuit relation with conductor sections 11 and 12 of a high voltage alternating current electric power transmission line. In the particular illustration shown the conductor sections 11 and 12 are in the form of flat bus bars. It will be understood that they may take other forms and that, for polyphase operation, this assembly is employed for each of the phases and is connected in series curcuit relation with the respective conductor sections.

The conductor sections 11 and 12 are shown as having downturned ends 13 and 14 that are secured by clamp bolts 15 and 16 to flat surfaces 17 and 18. They are located, respectively, on a transfer conductor 19 and a tubular housing 20 both of which are formed of suitable metal, such as cast aluminum. It will be noted that the flat surfaces 17 and 18 are located along the same horizontal axis. The tubular housing 20 has a flat bottom 21 that is provided with a central opening 22 for a purpose that will be apparent presently.

In order to maintain the current path through the coaxial shunt as shown in FIG. 3 the transfer conductor 19 is insulated from the tubular housing 20 by an insulating spacer 23, FIG. 5, which is provided therebetween in the form of a plate of insulation. Bolts 24 extend through ears 25, that are integral with the transfer conductor 19, into the tubular housing 20 as here shown. Insulation for the bolts 24 is provided by insulating sleeves 26 and insulating washers 27.

Energization for the radio transmitter 10 is provided by a magnetic core 28 which links the transfer conductor 19 and a secondary winding 29. The transfer conductor 19 constitutes a single turn primary winding of a transformer which includes the magnetic core 28 and a secondary winding 29. The transfer conductor 19 has a downturned section 30 which terminates in a horizontal flange 31 that is secured by bolts 32 to the upper closed end 33 of a metallic cap 34. Bolts 35 secure the lower outflared end of the metallic cap 34 to the upper end of a tubular resistive element 36 which is telescoped within the tubular housing 20 and forms therewith a coaxial non-inductive shunt. Bolts 37 secure the lower end of the tubular resistive element 36 to the bottom 21 of the tubular housing 20 and in good electrical contact engagement therewith. The current path through the housing 20, resistive element 36 and metallic cap 34 to the transfer conductor 19 is indicated by the arrows 38 in FIG. 3. It will be understood that a portion of this path for the alternating current is essentially non-inductive such that a voltage drop taken along the tubular resistive element 36 is an accurate, in-phase analog of the current flow between the conductor sections 11 and 12.

For a lower current rating the length of the tubular resistance element 36 is increased and is provided with an integral closed end corresponding to the closed end 33 of the cap 34. Thus the same transfer conductor 19 and tubular housing 20 can be employed without change for different current ratings.

As shown in FIG. 4, in the annular space between the tubular resistive element 36 and the tubular housing 20 there is a filling 39 of electrically insulaitng but heat conductive material. For example, the material 39 can be a metal filled epoxy the purpose of which is to maintain the electrical insulation between the resistive element 36 and the tubular housing 20 while providing for good heat transfer therebetween and particularly from the former to the latter to reduce the interior temperature of the coaxial shunt and the temperature of the heat sensitive parts therein. An opening 40 in the bottom of the tubular resistive element 36 is in alignment with the opening 22 in the bottom 21 of the tubular housing 20.

As shown in FIG. 4, the upper end of the tubular housing 20 is closed by an upper end cap 41 that may be formed of conducting material such as cast aluminum. An insulating ring 42 is interposed between the under side of the upper end cap 41 and the upper end of the tubular housing 20. An O-ring seal 43 is employed to provide a sealed connection between the upper end of the insulating ring 42 and the lower end of the end cap 41. The upper end cap 41 is secured in place on the tubular housing 20 by a pair of steel bolts one of which is shown at 44. They extend into the transfer conductor 19 and are insulated at their upper ends (not shown) from the upper end cap 41.

With a view to improving the heat reflecting ability of the upper end cap 41, it is provided with a heat reflecting coating 45, such as a white coating of a material having good ultraviolet radiation resistance. Since the radio transmitter 10 is intended to be located out of doors where it is subject to sunlight, it is important to reflect as much heat as possible from the upper end cap 41 to minimize the interior temperature.

Within the upper end cap 41 there is mounted a heat sink 46 that is formed preferably of an aluminum casting and is secured by bolts 47 and 48 to the underside of the upper end cap 41. As shown more clearly in FIG. 6, the heat sink 46 is arranged to carry power supply circuit means that is generally indicated at 49 and is arranged to be energized from the secondary winding 29 of the transformer previously referred to. The power supply circuit means 49 includes Zener diodes 50, a capacitor 51 and a bridge rectifier 52. On energization, the Zener diodes 50 generate a substantial amount of heat. It is for this reason that the power supply circuit means 49 is mounted on the heat sink 46 which is secured in good heat conducting relation to the upper end cap 41 by the bolts 47 and 48.

In FIGS. 4, 7 and 8 there is shown, generally at 54, a module connector which is supported by spacers 55 one of which is shown in FIG. 4. The spacers 55 are mounted on and secured to the under side of the upper closed end 33 of the metallic cap 34 which has an opening 56 for receiving a coaxial antenna cable 57 connected to the upper end cap 41 and a power cable 58 connected to the power supply circuit means 49. Modulating coaxial connections 59 are connected to spaced points **59*a* and 59*b* along the tubular resistive element 36 for the purpose of obtaining a voltage drop which is a direct function of the magnitude of the alternating current flow between the conductor sections 11 and 12**.

The module connector 54 is provided with coaxial plugs 60, FIGS. 7 and 8, which are mounted suitably on an insulating plate 61. In addition, alignment pins 62 are carried by the module connector 54 and are arranged to be received in alignment sockets 63 of a radio transmitter electronics module that is indicated, generally, at 64 in FIGS. 9 and 10. It is provided with coaxial sockets

65 at its upper end to receive the coaxial plugs 60 that extend downwardly from the under side of the module connector 54. It will be understood that the radio transmitter electronics module 64 is insertable into the lower end of the coaxial shunt through the aligned openings 22 and 40 and is connectable by the coaxial plug and socket means provided by the coaxial plugs 60 and coaxial sockets 65 to be energized from the secondary winding 29 and to be modulated from the voltage drop along the tubular resistive element 36. The radio transmitter electronics module 64 can be removed from the radio transmitter 10 without disturbing the mechanical and electrical connections to the conductor sections 11 and 12. Since the power supply circuit means 49 remains in place after removal of the module 64, a load is maintained on the secondary winding 29.

Special precautions are taken to insure that the radio transmitter electronics module 64 is inserted in the proper position. It will be noted that the alignment pins 62, FIG. 7, are unsymmetrically arranged on the module connector 54. In addition the cross section of the electronics module 64, as seen in FIG. 10, is generally wedge shaped and is guided into position by a wedge shaped chassis guide 67, FIGS. 12 and 13, that is formed of suitable insulating material. Guide brackets 68, FIG. 4, carried by the module connector 54, serve to hold the chassis guide 67 in proper position.

Since considerable heat is generated in the operation of the electronics module 64, the heat generating elements thereof are mounted on a heat sink 69, FIG. 9, that is formed of good heat conducting material, such as cast aluminum. In addition the heat sink 69 provides a frame for the electronics module 64. The heat sink 69 has a cylindrical base portion 71 from which arms 72 extend laterally. They are provided with conical alignment openings 73 to receive alignment plugs 74, FIG. 4, for the purpose of further insuring proper axial location of the electronics module 64 within the coaxial shunt. The upper side 71', FIG. 10, of the cylindrical base portion 71 is in contact engagement with the lower surface 75 of the bottom 21 of the tubular housing 20 for the purpose of placing the heat sink 69 in good heat conducting relation to the housing 20. The upper side 71' and the surface 75 are anodized to electrically insulate them from each other and permit a ground reference connection at **59*b* through a plug 60 and its socket 65**.

A casing 76, FIG. 4, together with the heat sink 69 provides an enclosure for the components of the electronics module 64. The space within this enclosure is filled with an encapsulating material to secure these components in place and protect them from atmospheric conditions.

The lower end of the tubular housing 20 is closed by a lower end cap 78 that may be formed of a conducting material, such as cast aluminum. The construction is shown more clearly in FIGS. 4, 9 and 11 of the drawings. Here it will be observed that an insulating ring 79 is interposed between the lower end of the tubular housing 20 and the upper end of the lower end cap 78. O-rings 80 and 81 serve to provide sealed connections between the upper and lower ends of the insulating ring 79 and the parts that they respectively engage. Insulating studs 82 are employed for securing the lower end cap 78 to the cylindrical base portion 71 of the electronics module 64 for the purpose of providing a unitary construction to the end that the electronics module 64 and the lower end cap 78 are removable and insertable as a unit. Metallic ferrules 83 and 84, FIG. 9, are secured to the upper and lower ends of the insulating studs 82. Bolts 85 are threaded into the ferrules 83 to secure them to the cylindrical base portion 71 while studs 86 on the ferrules 84 are threaded at 87 into the lower end cap 78. The lower end cap 78 functions as a part of the antenna for the radio transmitter 10 and a coaxial conductor 88 extends therefrom to the electronics module 64. A white heat reflecting coating 89 overlies the lower end cap 78 to reduce the absorption of external heat.

Provision is made for removably clamping the electronics module 64 and the lower end cap 78 on the lower end of the tubular housing 20. For this purpose keeper means in the form of clamp bar brackets or hooks 93, FIGS. 4 and 11, are secured by diametrically oppositely located bolts 37 to the underside of the bottom 21 of the tubular housing 20. These brackets or hooks 93 have laterally opening slots 94, FIG. 4, that are arranged to receive the distal ends of a clamp bar 95 that preferably is formed of spring steel. These ends of the clamp bar 95 are arranged to react against the bottom surfaces 96 of the slots 94 which are provided by lateral arms 97 of the clamp bar brackets or hooks 93. For operating the clamp bar 95 it has secured thereto intermediate its ends a clamp bar nut 98 of suitable insulating material and threaded therein is a clamp bar bolt 99 which is journaled in a bearing portion 100 that is cast integrally with the lower end cap 78. An O-ring seal 101 is provided near the lower end of the bearing portion for the clamp bar bolt 99. A hexagonal head 102 of the clamp bar bolt 99 is arranged to receive a socket wrench that may be manipulated by a live line tool for applying and removing the assembly including the electronics module 64 and the lower end cap 78.

When the electronics module 64 and the lower end cap 78 are to be applied to the radio transmitter 10, the assembly is inserted through the openings 22 and 40 and guided into position by the alignment pins 62 and the chassis guide 67 as well as by the alignment plugs 74. Near the end of the application operation, the distal ends of the clamp bar 95 move past the lateral arms 97. Then the clamp bar bolt 99 is rotated and the distal ends of the clamp bar 95 are swung into the slots 94 until the ends contact the clamp bar brackets 93. Thereafter, continued rotation of the clamp bar bolt 99 causes the ends of the clamp bar 95 to engage the bottom surfaces 96 of the slots 94 with the result that continued rotation of the clamp bar bolt 99 forces the electronics module 64 and the lower end cap 78 into the completely assembled positions shown in FIG. 4.

For removing the electronics module 64 and the lower end cap 78, the clamp bar bolt 99 is rotated in the opposite direction until the pressure exerted by the ends of the bar 95 on the clamp bar brackets or hooks 93 is relieved and these ends tend to move therealong. This movement continues until the ends engage lugs 103 at the ends of the arms 97 whereupon continued rotation of the clamp bar bolt 99 is effective to elevate the clamp bar 95 above these lugs 103. The clamp bar 95 then can be rotated out of the slots 94. Thereafter, the electronics module 54 and the lower end cap 78 can be withdrawn from the radio transmitter 10.

It will be noted in FIGS. 2 and 4 that four bolts 15 and 16 are employed for securing the down turned ends 13 and 14 of the conductor sections 11 and 12 to the transfer conductor 19 and the tubular housing 20 along a horizontal axis. Also it will be noted, FIG. 5, that a pair of bolts 24, properly insulated, is arranged to secure the transfer conductor 19 to the upper end of the tubular housing 20. This arrangement provides a rigid construction for securing the assembly in operative position not only for the purpose of supporting the weight of the radio transmitter 10 but also for the purpose of resisting the magnetic forces that are set up on flow of relatively high current through the conductor sections 11 and 12 and through the coaxial shunt formed by the tubular housing 20 and the tubular resistive element 36 together with the metallic cap 34 and the transfer conductor 19. In addition, this rigid construction is capable of resisting conductor or bus tension forces and, when tubular members are used, it is capable of resisting bending moments and tension forces set up therein.

What is claimed as new is:

1. A transmitter for sending to a remote point a signal corresponding to the magnitude of a variable at the potential of a high voltage current carrying electric power transmission line conductor comprising:

a tubular housing of good heat conducting metal for series connection at one end with said line conductor, a tubular resistive element telescoped within and laterally spaced from said housing and at one end connected to the other end of said housing, a transfer conductor of good heat conducting metal connected to the other end of said tubular resistive element for series connection with said line conductor whereby said housing, resistive element and transfer conductor are connected in series circuit with said line conductor, a metallic end cap overlying said one end of said housing and insulated therefrom, a radio transmitter telescoped within said resistive element including a metallic chassis forming a heat sink in good heat conducting relation to said other end of said housing, and a metallic cap overlying said other end of said housing and insulatingly connected to said metallic chassis.

2. The transmitter according to claim 1 wherein the lateral space between said housing and said resistive element is filled with heat conducting electrical insulating material to facilitate flow of heat to said housing.

3. The transmitter according to claim 1 wherein the connections of said housing and said transfer conductor to said line conductor are located along substantially the same axis.

4. The transmitter according to claim 1 wherein said end caps carry heat reflecting exterior coatings.

5. The transmitter according to claim 1 wherein:

a magnetic core links said transfer conductor, a secondary winding links said magnetic core, power supply circuit means is connected to said secondary winding for energizing said radio transmitter and is characterized by substantial heat generation, and a metallic support member is secured to the first mentioned end cap, carries said power supply circuit means, and constitutes a heat sink.

6. The transmitter according to claim 1 wherein:

modulating circuit means interconnect said resistive element and said radio transmitter, and mating plug and socket means detachably interconnect said circuit means.

7. The transmitter according to claim 1 wherein:

a magnetic core links said transfer conductor, a secondary winding links said magnetic core, energizing circuit means interconnect said secondary winding and said radio transmitter, modulating circuit means interconnect said resistive element and said radio transmitter, and mating plug and socket means detachably interconnect said circuit means.

8. The transmitter according to claim 1 wherein clamp means carried by said housing and the second mentioned end cap secure said radio transmitter in place within said resistive element.

9. The transmitter according to claim 8 wherein said clamp means includes:

keeper means mounted on said housing, a clamp bar for engaging said keeper means, and a bolt rotatably mounted on said second mentioned end cap and threaded into said clamp bar.

10. The transmitter according to claim 9 wherein means insulate said bolt from said clamp bar.

11. The transmitter according to claim 9 wherein said keeper means includes:

a keeper element having a laterally opening slot for receiving one end of said clamp bar, and said bolt has an operating portion outside of said second mentioned end cap and is arranged when rotated in one direction to rotate said one end of said clamp bar into said slot and vice versa.

12. The transmitter according to claim 1 wherein:

a magnetic core links said transfer conductor, a secondary winding links said magnetic core, power supply circuit means is connected to said secondary winding for energizing said radio transmitter, means removably mount said radio transmitter within said resistive element, and mating plug and socket means detachably interconnect said circuit means and said radio transmitter whereby, on removal of said radio transmitter, said power supply circuit remains connected to and constitutes a load on said secondary winding and said tubular housing, said tubular resistive element and said transfer conductor remain in place.

13. The transmitter according to claim 1 wherein the relation between said tubular housing and said transfer conductor is characterized by being adapted to receive different lengths of said tubular resistive element to provide for operation of said transmitter at different current ratings.

References Cited

UNITED STATES PATENTS

| | | | |
|---|---|---|---|
| 3,372,334 | 3/1968 | Fenoglio et al. -- | 324—127 XR |
| 3,428,896 | 2/1969 | Schweitzer | 324—127 XR |

ALFRED E. SMITH, Primary Examiner

U.S. Cl. X.R.

325—119; 340—207